United States Patent [19]
Moyer et al.

[11] Patent Number: 5,812,868
[45] Date of Patent: Sep. 22, 1998

[54] METHOD AND APPARATUS FOR SELECTING A REGISTER FILE IN A DATA PROCESSING SYSTEM

[75] Inventors: William C. Moyer, Dripping Springs; John Arends, Austin, both of Tex.

[73] Assignee: Motorola Inc., Schaumburg, Ill.

[21] Appl. No.: 714,644

[22] Filed: Sep. 16, 1996

[51] Int. Cl.[6] .................................................. G06F 13/00
[52] U.S. Cl. .................... 395/800.23; 395/569; 395/591; 395/800.4
[58] Field of Search ................................ 395/800.23, 569, 395/800.4, 734, 742, 740, 591

[56] References Cited

U.S. PATENT DOCUMENTS

| | | | |
|---|---|---|---|
| 4,698,747 | 10/1987 | Thompson et al. | 395/725 |
| 4,937,861 | 6/1990 | Cummins | 380/2 |
| 5,115,506 | 5/1992 | Cohen et al. | 395/725 |
| 5,274,825 | 12/1993 | Lemay et al. | 395/725 |
| 5,386,563 | 1/1995 | Thomas | 395/650 |
| 5,426,766 | 6/1995 | Ogata | 395/425 |
| 5,680,599 | 10/1997 | Jaggar | 395/591 |
| 5,680,641 | 10/1997 | Sidman | 395/840 |
| 5,701,443 | 12/1997 | Jaggar | 395/734 |

OTHER PUBLICATIONS

Advanced RISCH Machines, ARM7TDMI Data Sheet, Issued Aug. 1995, pp. i through vi; 1–1 through 6–24.

*Primary Examiner*—Larry D. Donaghue

[57] ABSTRACT

A data processing system selects between a general register file and an alternate register file during an operation such that resources of the data processor may be more flexibly mapped to a context of the data processing system and, therefore, be more efficiently utilized. A control bit in a processor status register (PSR) is used to select between a general register file and an alternate register file depending upon a logic value to which it is set to a during an exception handling process.

12 Claims, 4 Drawing Sheets

| EXCEPTION VECTOR ASSIGNMENTS ||| 
|---|---|---|
| VECTOR NUMBER(S) | VECTOR OFFSET (HEX) | ASSIGNMENT |
| 0 | 000 | RESET |
| 1 | 004 | MISALIGNED ACCESS |
| 2 | 008 | ACCESS ERROR |
| 3 | 00C | RESERVED |
| 4 | 010 | ILLEGAL INSTRUCTION |
| 5 | 014 | PRIVILEGE VIOLATION |
| 6 | 018 | TRACE EXCEPTION |
| 7 | 01C | BREAKPOINT EXCEPTION |
| 8 | 020 | UNRECOVERABLE ERROR |
| 9 | 024 | SOFT RESET |
| 10 | 028 | INT AUTOVECTOR |
| 11 | 02C | FINT AUTOVECTOR |
| 12 | 030 | HARDWARE ACCELERATOR |
| 13 | 034 | (RESERVED) |
| 14 | 038 | |
| 15 | 03C | |
| 16-23 | 040-05C | TRAP #0-7 INSTRUCTION VECTORS |
| 24 | 060 | (RESERVED) |
| 25 | 064 | |
| 26 | 068 | |
| 27 | 06C | |
| 28 | 070 | |
| 29 | 074 | |
| 30 | 078 | |
| 31 | 07C | |
| 32-127 | 080-1FC | RESERVED FOR VECTORED INTERRUPT CONTROLLER USE |

*FIG. 5*

METHOD AND APPARATUS FOR SELECTING A REGISTER FILE IN A DATA PROCESSING SYSTEM

FIELD OF THE INVENTION

The present invention relates, in general, to a data processor which may be interrupted and, more particularly, to a data processor which includes a dedicated set of registers which are accessed when an interrupt is being processed by the data processor.

BACKGROUND OF THE INVENTION

In devices such as microprocessors and other digital data processors, a central processing unit (CPU) is utilized to control execution and processing of operations. The CPU includes a register set which is utilized by the CPU during both normal operation and exception processing, in a manner well known to those skilled in the data processing art. Whenever a prior operation is interrupted by an exception process such as an interrupt operation, information stored in the register set of the data processor may be corrupted because the interrupt processing program will use the same registers and may change some of the values therein.

The conventional solution to the aforementioned corruption problem is to save the current values of some or all of the registers in a memory prior to beginning the processing of the interrupt (also referred to as "stacking") and reading those saved data values back into the registers from the memory (also referred to as "unstacking") when interrupt processing is complete. While this solution theoretically capable of handling an unlimited number of "nested" interrupts (i.e.: interrupts which interrupt other interrupt programs), this solution is also time consuming and requires the CPU of the data processor to implement hardware support for controlling the storage and retrieval of the current values of the registers. Additionally, some microprocessors provide several register sets (also known as register banks) for use during interrupt processing. An interrupt program simply uses a different set of registers than was being used by the interrupted program, thus avoiding the need to stack the register contents. This approach is very costly in terms of the silicon area when the problem of nested interrupts is considered. Duplicating all the necessary registers in order to permit a reasonable number of nested interrupts may well require an unreasonable number of registers. Additionally, a tradeoff is usually made between a number of nested levels and a number of nested register.

BRIEF DESCRIPTION OF THE DRAWINGS

FIG. 5 illustrates, in tabular form, an exception vector table, in accordance with one implementation of the present invention.

DETAILED DESCRIPTION OF THE INVENTION

Figure 1:
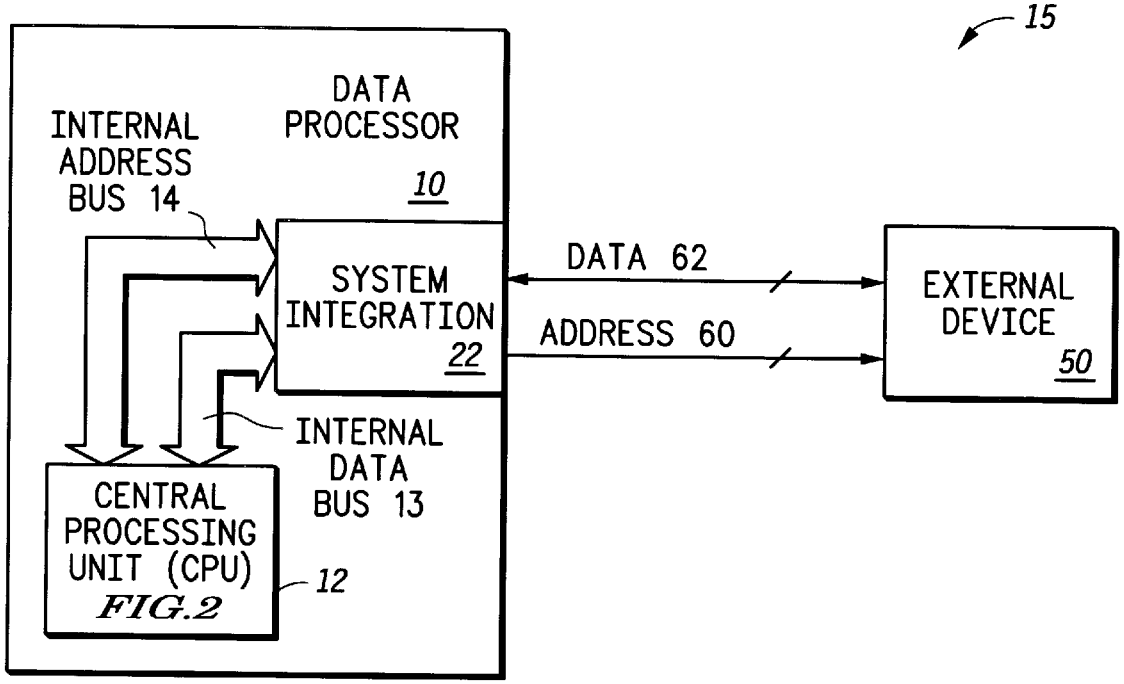
FIG. 1 illustrates, in block diagram form, a data processing system which implements an apparatus and method for selecting a register file.

The present invention provides an apparatus and method for selecting a register file in a data processing system. The apparatus and method of the present invention allows the data processing system to select between a general register file and an alternate register file during an operation such that resources of the data processor may be more flexibly mapped to a context of the data processing system and, therefore, be more efficiently utilized. The present invention implements this increased flexibility without requiring additional overhead in the form of circuitry or time requirements.

The present invention flexibly maps registers of a data processor within a data processing system through the use of a control bit in a processor status register (PSR). The control bit in the PSR selects between a general register file and a alternate register file depending upon a logic value to which it is set to a during an exception handling process.

During that process in which the control bit in the PSR is set, the data processor first determines a vector number which corresponds to the exception the data processor is processing. This vector number is then used to form a vector offset. To determine an address of the first instruction of the exception handler, the data processor combines the vector offset with the value contained in a vector base register to obtain the memory address of the exception vector. Next, the data processor fetches a data value from the vector table entry, loads a new program counter (PC) value from the exception vector table entry with the address of the first instruction of the exception handler, and loads the control bit in the PSR from a low order bit of the vector table entry to determine which register file to use when the exception handler is entered. The data processor then resumes execution at the new PC location.

The use of the control bit in the PSR and the selective modification of that control bit based on an entry in the exception vector table enables the data processing system of the present invention to select a working register set for use in handling an exception provided to the data processing system with a minimal amount of added time and circuit overhead. Due to the time critical nature of certain interrupt operations, especially fast interrupts, the method and apparatus of the present invention for selecting a register file to use during execution of an interrupt handling routine is especially useful. The use of a low order portion of the exception vector to automatically load the control bit in the PSR to select a working register set effectively results in no added overhead. In a following discussion, the connectivity and operation of one embodiment of a data processing system which implements the present invention will be provided in greater detail.

Connectivity of the Present Invention

In the following description of the connectivity of the present invention, the term "bus" will be used to refer to a plurality of signals or conductors which may be used to transfer one or more various types of information such as data, addresses, control or status. The terms "assert" and "negate" will be used when referring to the rendering of a signal, status bit, or similar apparatus into its logically true or logically false state, respectively. If the logically true state is a logic level 1, the logically false state will be a logic level 0. And, if the logically true state is a logic level 0, the logic false state will be logic level 1.

Furthermore, the symbol "$" preceding a number indicates that the number is represented in base 16 form. The symbol "%" preceding a number indicates that the number is represented in its binary or based 2 form.

In the following description of the present invention, it should be noted that the terms field and bit may be used interchangeably.

Referring now to FIG. 1, FIG. 1 illustrates a data processing system 15 having a data processor 10, and an external device 50. Data processor 10 includes a central processing unit (CPU) 12 and a system integration circuit 22. In one embodiment of the present invention, data processor 10 and external device 50 are each implemented as separate integrated circuits. In alternate embodiments of the present invention, all of data processing system 15 may be implemented on a single integrated circuit.

In FIG. 1, data processor 10 is coupled to external device 50 by an Address bus 60 and a Data bus 62. Within data processor 10, CPU 12 is coupled to system integration circuit 22 by an Internal Data bus 12 and an Internal Address bus 14.

Note, in some embodiments of the present invention, data processor 10 is formed on a single integrated circuit. Additionally, in some embodiments, data processor 10 is a single chip micro-controller. In alternate embodiments, data processor 10 may be implemented using any type of electrical circuitry. External device 50 may be any type of integrated circuit, including a memory. Alternate embodiments of data processing system 15 may include more, fewer, or different external integrated circuits. In addition, buses 60 and 62 may be implemented using any number of bits.

Figure 2:
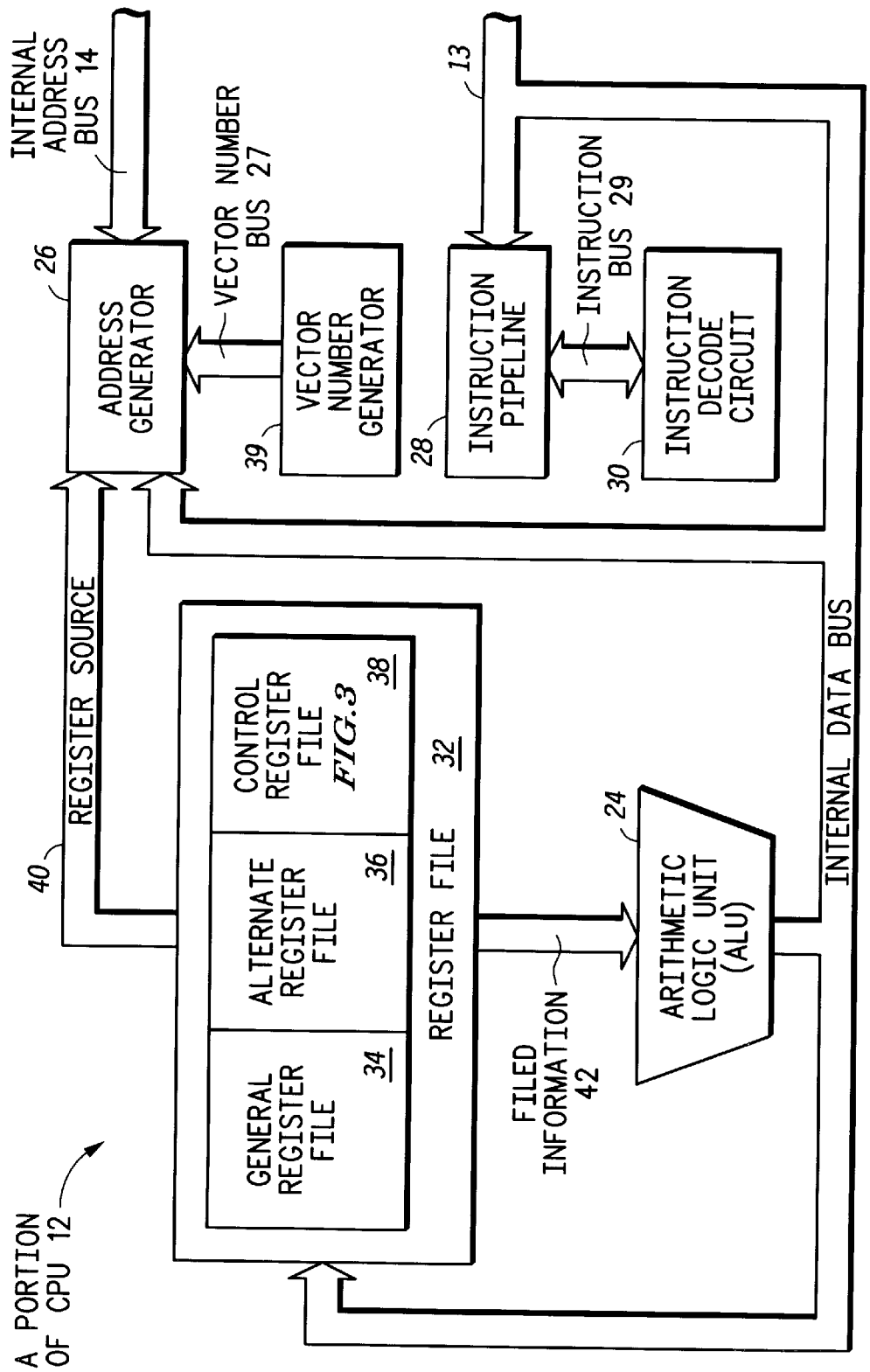
FIG. 2 illustrates, in block diagram form, a central processing unit (CPU) in accordance with one implementation of the present invention.

FIG. 2 illustrates a portion of CPU 12 in greater detail. The portion of CPU 12 includes an arithmetic logic unit (ALU) 24, an address generator 26, an instruction pipeline 28, an instruction decode circuit 30, a register file set 32, and a vector number generator 39. Register 32 includes a general register file 34, an alternate register file 36, and a control register file 38. Internal Address bus 14 is coupled to address generator 26. Address generator 26 is coupled to register file 32 via a register source bus 40. Address generator 26 is coupled to internal data bus 12. Vector number generator 39 is coupled to address generator 26 via a vector number bus 27. Internal data bus 12 is coupled to instruction pipeline 28, ALU 24, and register file 32. Instruction decode circuit 30 is bi-directionally coupled instruction pipeline 28 via an Instruction bus 29. Register file 32 is coupled to ALU 24 via a Filed Information bus 42.

Description of Operation

In data processor 10, exceptions and interrupts are recognized at a decode stage or an execution stage of an instruction pipeline. Thus, when an instruction is provided to instruction decode circuit 30 and decoded, an interrupt may be recognized and processed, in lieu of normal instruction processing. In the implementation of the invention described herein, it should be noted that there are multiple interrupt levels which determine whether a given interrupt has priority over any other interrupt. Thus, an interrupt with a high priority will get processed more quickly than an interrupt with a lower priority which must wait for processing.

Additionally, data processor 10 utilizes two types of interrupts, conventional and fast interrupts. A type of interrupt determines whether the interrupt processing routine will explicitly select a normal register set such as general register file 34 of FIG. 2, or an alternate register set such as alternate register file 36. Conventional interrupts select a general register file 34 and fast interrupts select an alternate register file 36. It should be noted that an interrupt type does not affect the previously described priority scheme. A conventional interrupt will interrupt normal operation or any other interrupt which has a lower priority level. Likewise, a fast interrupt will interrupt normal operation of any other interrupt which has a lower priority level.

Figure 3:
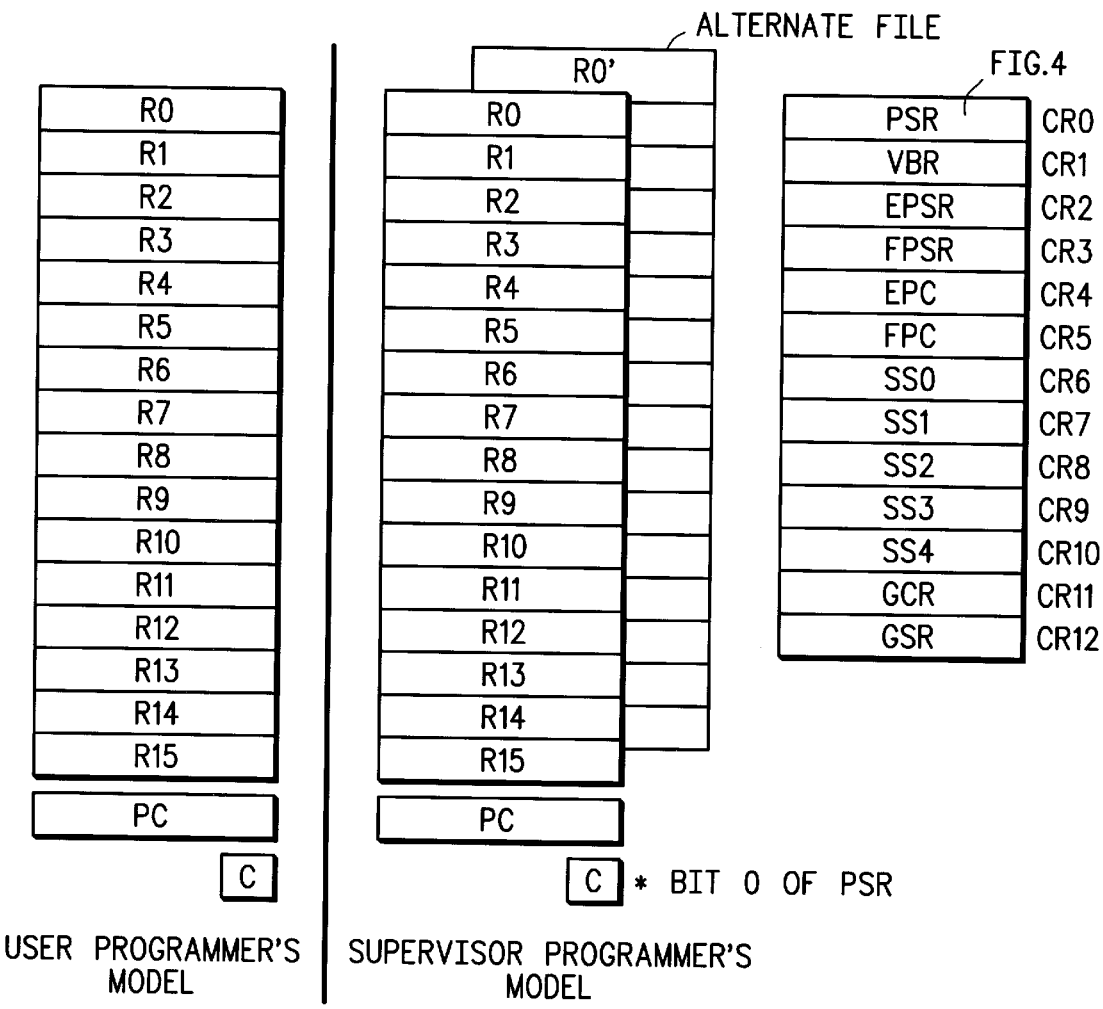
FIG. 3 illustrates, in tabular form, a register file set in accordance with one implementation of the present invention.

As previously mentioned, CPU 12 of data processing system 10 includes a general register file 34, an alternate register file 36, and a control register file 38. Each of general register file 34, alternate register file 36, and control register file 38 are illustrated in greater detail in FIG. 3. As observed in FIG. 3, CPU 12 includes 16 general purpose registers, the program counter (PC), and a condition/carry (C) bit. In the present embodiment of the invention, the C bit is implemented as bit 0 of the PSR and is the only portion of the PSR accessible by user mode software. Register file 32 also includes alternate register file 36 which consists of 16 general purpose registers, as well as a set of status/control registers and scratch registers.

Given the interrupts implemented by data processor 10, an exception processing sequence executed by data processor 10 will now be described in greater detail. When data processor 10 receives an interrupt, data processor 10 begins to execute an exception processing sequence. During a first step of the exception processing sequence, data processor 10 saves a copy of a status register (PSR) and a program counter (PC) of control register file 38 in an appropriate location of internal memory (not illustrated herein). The PSR contents are copied to the memory to preserve control and status information associated with normal operation of data processor 10. Similarly, the PC contents are copied to the memory to provide a pointer to a next instruction to be executed after data processor 10 has performed the exception processing sequence.

In a next step of the exception processing sequence, data processor 10 changes to a supervisor mode of operation by setting a supervisor (S) bit in the PSR and inhibits tracing of an exception handler by clearing a trace mode (TM) field in the PSR. An interrupt enabled by an interrupt enable (IE) bit of the PSR is also cleared to inhibit normal interrupt recognition. Fast interrupt exceptions and resets clear a fast interrupt enable (FE) bit in the PSR. It should be noted that the FE bit is unaffected by other exceptions.

During a second step of the exception processing sequence, data processor 10 determines a vector number which corresponds to the exception data processor 10 is processing in response to a received interrupt. The vector number may be provided directly from an interrupt controller interface to CPU 12 (not illustrated herein) or by internal logic of CPU 12. In the embodiment of the invention described herein, the vector number generator 39 generates the vector number and provides the vector number to address generator 26 via vector number bus 27. FIG. 5 illustrates one embodiment of an exception vector assignment table which may be implemented by address generator 26 to provide a correct vector offset value.

During a last step of the exception processing sequence, the vector number provided by vector number generator 39 is used to determine an address of a first instruction of an exception handler corresponding to the exception data processor 10 is processing. To calculate this address, the vector number is provided to arithmetic logic unit (ALU) 24 as the vector offset value. Concurrently, a value stored in a vector base register (VBR) of alternate register file 36 is provided to ALU 24. ALU 24 combines the vector offset with the value contained in the vector base register of alternate register file 36 to obtain a memory address of an exception vector. The memory address of the exception vector is used to access a word from a vector memory table entry corresponding to the memory address.

The memory table is stored in either an internal memory within data processor 10 (not illustrated herein) or a memory external to data processor 10 (not illustrated herein). When data processor 10 fetches the word from the vector table entry, data processor 10 loads a new program counter, (PC) value from the exception vector table entry with the memory address of the first instruction of the exception handler pointed to by the memory address. Furthermore, data processor 10 loads the AF control bit of the PSR from a low order bit of the vector table entry to determine which register file to use when the exception handler is entered. Data processor 10 then resumes execution of instructions at the new program counter location pointed to by the recently received PC value.

By using this technique to establish the control value in the PSR, access to alternate register file 36 is made available via a control bit in the PSR which is labeled AF (Alternate File). When alternate register file 36 is selected via the AF bit in the PSR, general purpose operands are accessed from therein. When the AF bit in the PSR is cleared, operands are accessed from general register file 34. Alternate register file 36, therefore, is provided to allow very low overhead context switching capability for real-time event handling. Alternate register file 36 is provided to reduce overhead associated with context switching, saving data, and restoring data for time critical tasks. When selected, alternate register file 36 replaces general register file 34 for all instructions which normally use a general register. As previously mentioned, alternate register file 36 is active when the AF bit in the PSR is set. It is disabled and not accessible when the AF bit in the PSR is cleared. Generally, important parameters and pointer values may be retained in alternate register file 36 such that they are readily accessible when a high-priority task is entered.

Figure 4:
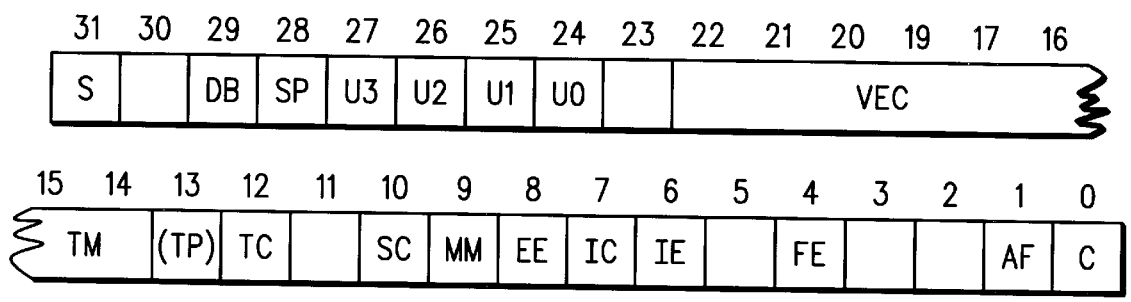
FIG. 4 illustrates, in tabular form, a process status register (PSR) in accordance with one implementation of the present invention.

The PSR is illustrated in greater detail in FIG. 4. The PSR stores the processor status and control information including the C bit, the interrupt masks, and other control bits. In a supervisor mode of operation, software may access the PSR. The control bits of the PSR indicate the following states for the processor: trace mode (TM bits), supervisor or user mode (S bit), and normal or alternate file state (AF). The control bits also indicate whether exception shadow registers are available for context saving and whether interrupts are enabled. At this point in discussion of the PSR, the AF bit will be described in greater detail. When the AF bit is set, alternate register file 36 is enabled. When the AF bit is cleared, general register file 34 is enabled. When an exception occurs, a low order bit of the exception vector content is copied to the AF bit to select the file to be used in processing the exception. Although hardware clears the AF bit on a reset operation, the AF bit is overwritten with the low order bit in the fetched reset vector.

The implementation of the invention described herein is provided by way of example only. However, many other implementations may exist for executing the functions described herein. For example, the present invention may be implemented as a single integrated circuit or multiple discrete circuits.

While the present invention has been illustrated and described with reference to specific embodiments further modifications and improvements will occur to those skilled in the art. It is to be understood, that therefore, that this invention is not limited to the particular forms illustrated and that the appended claims cover all the modifications that do not depart from the scope of this invention.

We claim:

1. A data processor, comprising:
   an interrupt recognition circuit which determines when an exception processing operation should be executed;
   a first register set;
   a second register set;
   a control bit which is modified during execution of the exception processing operation, the control bit selecting one of the first register set and the second register set for use during execution of a remaining portion of the exception processing operation; and
   a memory for storing an exception vector corresponding to the exception processing operation, wherein a first bit of the exception vector determines a logic value of the control bit.

2. The data processor of claim 1, further comprising:
   an address generator for generating a vector offset corresponding to an address of a first instruction of an exception routine which corresponds to the exception processing operation.

3. The data processor of claim 2, further comprising:
   an arithmetic logic unit coupled to the address generator for receiving the vector offset and coupled to one of the first and the second register sets for receiving a vector base address, the arithmetic logic unit logically combining the vector offset and the vector base address to obtain the address of the first instruction of the exception routine.

4. The data processor of claim 3 wherein a vector entry of the exception routine specifies a logic value of the control bit.

5. A method for executing an exception processing operation in a data processor, comprising the steps of:
   detecting an interrupt which requires execution of the exception processing operation;
   calculating an address of a first instruction of an exception handler which corresponds to the exception processing operation;
   retrieving a data value corresponding to the address of the first instruction of the exception handler;
   modifying a first control bit in response to the data value;
   selecting a first register set for use during execution of the exception processing operation when the first control bit is in a first logic state; and
   selecting a second register set for use during execution of the exception processing operation when the first control bit is in a second logic state.

6. The method of claim 5, further comprising the steps of:
   accessing a first operand from the first register set when the first control bit is in the first logic state; and
   accessing a second operand from the second register set when the first control bit is in the second logic state.

7. The method of claim 6, further comprising the step of:
   using one of the first operand and the second operand during execution of the exception processing operation.

8. The method of claim 5, wherein a step of calculating an address of a first instruction of an exception handler, further comprises the steps of:
   retrieving a vector offset value which corresponds to the interrupt;
   retrieving a base address value from one of the first register set and the second register set
   logically combining the vector offset value and the base address value to generate a memory address; and
   retrieving the address of the first instruction of the exception handler from a memory location corresponding to the memory address.

9. The method of claim 5, further comprising the step of:

modifying a second control bit in response to the data value, the second control bit indicating a mode of operation of the data processor.

10. The method of claim 5, further comprising the steps of:

saving a copy of a status register before execution of the exception processing operation.

11. A data processor, comprising:

an interrupt recognition circuit which determines when an exception processing operation should be executed;

a first register set;

a second register set;

a control bit which is modified during execution of the exception processing operation, the control bit selecting one of the first register set and the second register set for use during execution of a remaining portion of the exception processing operation; and a memory for storing an exception bit corresponding to the exception processing operation, the exception bit determining a logic value of the control bit.

12. A data processor, comprising:

an interrupt recognition circuit which determines when an exception processing operation should be executed;

a first register set;

a second register set;

a control bit which is modified during execution of the exception processing operation, the control bit selecting one of the first register set and the second register set for use during execution of a remaining portion of the exception processing operation;

wherein a first instruction of the exception processing operation specifies a logic value of the control bit.

* * * * *